US006663192B2

(12) United States Patent
Bourguet et al.

(10) Patent No.: US 6,663,192 B2
(45) Date of Patent: Dec. 16, 2003

(54) ARCHITECTURE FOR THE HYDRAULIC BRAKING SYSTEM OF AN AIRCRAFT

(75) Inventors: Vincent Bourguet, Savigny sur Orge (FR); Walid Hamzeh, Levignac (FR)

(73) Assignee: Messier-Bugatti, Velizy Villacoublay (FR)

( * ) Notice: Subject to any disclaimer, the term of this patent is extended or adjusted under 35 U.S.C. 154(b) by 0 days.

(21) Appl. No.: 09/984,795

(22) Filed: Oct. 31, 2001

(65) Prior Publication Data

US 2002/0057012 A1 May 16, 2002

(30) Foreign Application Priority Data

Nov. 10, 2000 (FR) ............................................. 00 14447

(51) Int. Cl.[7] ............................................. B60T 13/70
(52) U.S. Cl. .......................... 303/15; 303/14; 303/6.01; 303/9.61
(58) Field of Search ........................ 303/15, 126, 14, 303/6.01, 9.61

(56) References Cited

U.S. PATENT DOCUMENTS

| 2,692,662 | A | * | 10/1954 | Clifton ........................ 188/355 |
| 4,425,006 | A | * | 1/1984 | Bertrand et al. ................ 303/3 |
| 4,792,192 | A | * | 12/1988 | Tveitane ........................ 303/13 |
| 4,834,465 | A | * | 5/1989 | Guichard et al. .............. 303/15 |
| 5,020,322 | A | * | 6/1991 | Schwarz ........................ 60/404 |
| 5,328,251 | A | * | 7/1994 | Brearley ........................ 303/9 |
| 5,397,173 | A |   | 3/1995 | Bourguet ........................ 303/2 |
| 5,417,477 | A | * | 5/1995 | Lasbleis ........................ 303/3 |
| 5,456,523 | A | * | 10/1995 | Boehringer .................... 303/13 |
| 5,722,744 | A | * | 3/1998 | Kupfer et al. ............... 303/189 |
| 5,961,190 | A | * | 10/1999 | Brandmeier et al. ......... 303/152 |
| 6,193,326 | B1 | * | 2/2001 | Ybert ........................... 303/15 |
| 6,390,571 | B1 | * | 5/2002 | Murphy ....................... 303/126 |
| 6,402,259 | B2 | * | 6/2002 | Corio et al. ................... 303/20 |

FOREIGN PATENT DOCUMENTS

EP      0 328 175      8/1989      ........... B60T/17/18

* cited by examiner

Primary Examiner—Jack Lavinder
Assistant Examiner—Benjamin A Pezzlo
(74) Attorney, Agent, or Firm—Sughrue Mion, PLLC

(57) ABSTRACT

The invention relates to an architecture for a hydraulic braking system suitable for an aircraft of the type having at least one group of main landing gear units, each landing gear unit comprising a determined number of wheels each provided with a hydraulically actuated brake, the or each landing gear group being associated with a hydraulic circuit provided with hydraulic equipment and adapted to deliver hydraulic fluid under pressure to all of the brakes of the landing gear group, the hydraulic fluid being pressurized by at least one aircraft pressure generator system associated with an aircraft hydraulic fluid supply. According to the invention, accumulators are connected on the or each circuit in sufficient number for each accumulator to feed two pairs of brakes, each pair of brakes being mounted on a distinct landing gear unit, and an electrically-driven pump being arranged to maintain a predetermined pressure level in all of the accumulators of the circuit in question.

12 Claims, 1 Drawing Sheet

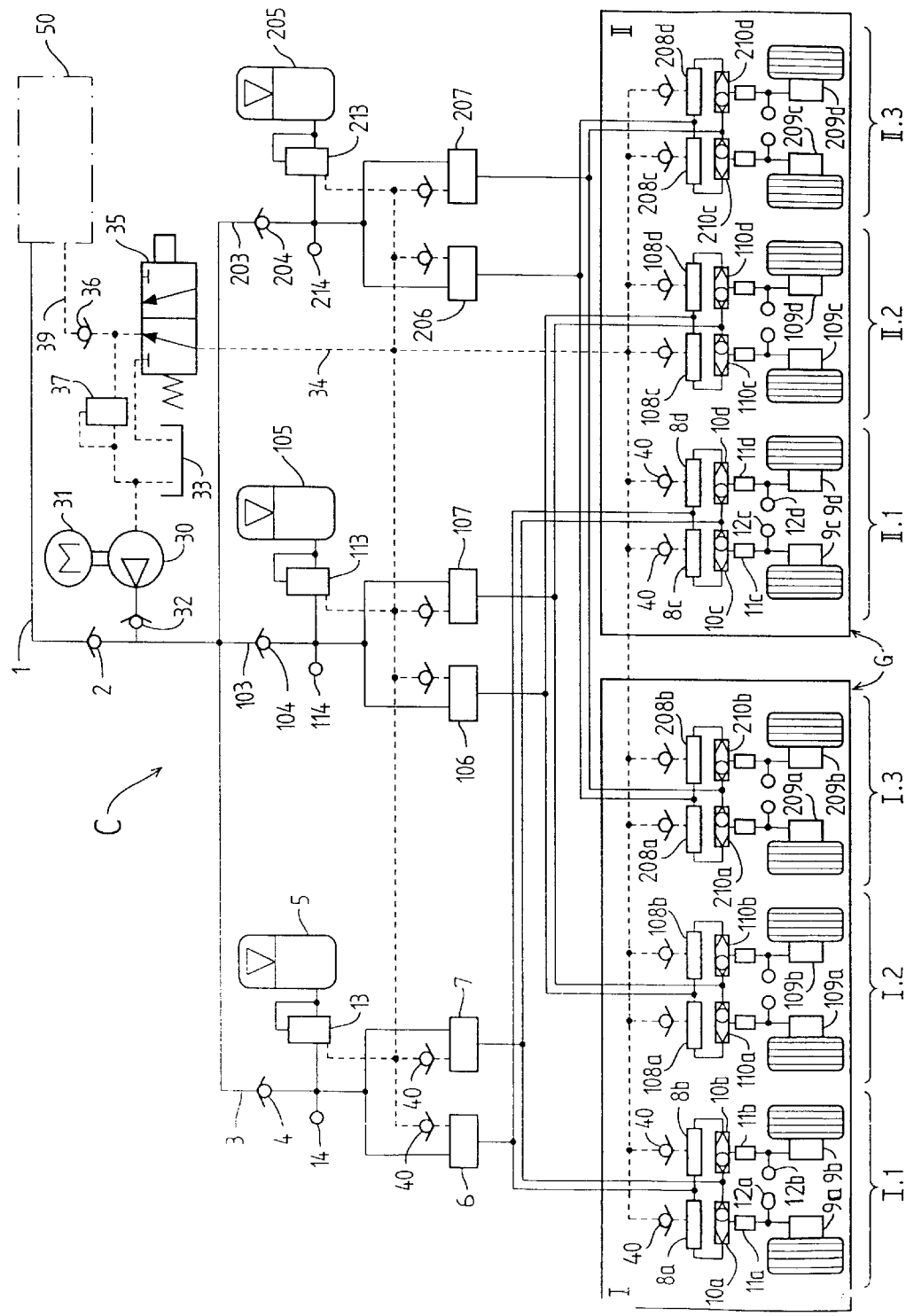

ARCHITECTURE FOR THE HYDRAULIC BRAKING SYSTEM OF AN AIRCRAFT

The invention relates to an architecture for a hydraulic braking system adapted to aircraft having landing gear with braked wheels.

BACKGROUND OF THE INVENTION

In general, an airplane is fitted with a main hydraulic circuit, said hydraulic circuit being arranged to feed the braking actuators of wheels carried by main landing gear units, said actuators being in the form of brakes each comprising a first series of "rotor" disks constrained to rotate with the wheels and associated with a second series of "stator" disks that are prevented from rotating, the disks in the two series alternating along the axis of rotation of a wheel and being pressed against one another by pistons mounted to slide in a hydraulic ring and actuated by means of hydraulic fluid under pressure delivered by the main hydraulic circuit of the aircraft. This pressure of the disks against one another then generates friction because the rotor disks are rotating with the wheel while the stator disks are prevented from rotating. This dissipates the kinetic energy of the aircraft in the form of the heat that is generated by the friction, thus slowing down the aircraft.

Braking is a critical function for an aircraft, and if braking fails completely, e.g. on landing, then there is an unacceptably high likelihood of passenger lives being at risk, not to mention the possibility of the aircraft itself being damaged. Furthermore, safety requirements lead to aircraft systems being designed so as to ensure that mere breakdown of any one system (e.g. the main hydraulic circuit) cannot lead to a catastrophe.

Thus, as a general rule, aircraft are fitted with an emergency hydraulic circuit whose hydraulic fluid is applied to the brakes in the event of the main hydraulic circuit failing. There are two approaches to brake design. In a first variant the brakes have dual cavities, i.e. their rings carry two series of pistons, a first series being actuated by the main hydraulic circuit, while the second series is actuated by the emergency hydraulic circuit. The two circuits are thus kept apart all the way to the final actuators. In a second variant, each brake has a single cavity only, i.e. only one series of pistons which can be fed selectively from one or other of the circuits via a shuttle valve which is generally situated in the wheel well and which delivers hydraulic fluid to the brake from whichever circuit is under the greater pressure. The advantage of this configuration is that the brake rings are simplified, as is the hydraulic pipework that extends along the landing gear itself, since a single pipe per brake then suffices.

Given the size and weight of the commercial aircraft presently under consideration, manufacturers have been constrained to consider using large numbers of main landing gear units, for example two wing units and one or two fuselage units.

This increase in the number of landing gear units leads to a corresponding increase in the amount of pipework required for the two braking circuits, particularly since each wing or fuselage landing gear unit is expected to be fitted with at least six wheels. This increase number of pipes and associated increase in pipework length due to the large size of the aircraft leads to an economically unacceptable penalty in the weight breakdown of the aircraft.

OBJECTS AND SUMMARY OF THE INVENTION

In order to simplify and lighten the braking system of such an aircraft, the invention proposes an architecture for a hydraulic braking system suitable for an aircraft of the type having at least one group of main landing gear units, each landing gear unit comprising a determined number of wheels each provided with a hydraulically actuated brake, the or each landing gear group being associated with a hydraulic circuit provided with hydraulic equipment and adapted to deliver hydraulic fluid under pressure to all of the brakes of the landing gear group, the hydraulic fluid being pressurized by at least one aircraft pressure generator system associated with an aircraft hydraulic fluid supply. According to the invention, accumulators are connected on the or each circuit in sufficient number for each accumulator to feed two pairs of brakes, each pair of brakes being mounted on a distinct landing gear unit, and an electrically-driven pump being arranged to maintain a predetermined pressure level in all of the accumulators of the circuit in question.

Thus, failure of any one circuit affects only a single landing gear group, and the brakes carried by the landing gear in another group continue to be fed normally by the other circuit. In the event of one of the circuits failing, e.g. due to pipework breaking or to the pressure generator system failing, then the accumulators, assisted where appropriate by the electrically-driven pump, take over to maintain sufficient pressure to provide braking that is acceptable for passenger safety. If these means also should fail, the aircraft would still retain braking ability on the other landing gear group, which is not possible with prior architectures. In addition, this architecture enables the hydraulic pipework to be simplified considerably, since there is no need to take pipes from both circuits to each landing gear unit. This architecture also makes it possible to make use of single-cavity brakes, which are lighter in weight and less complex than dual-cavity brakes.

Naturally, the landing gear groups should be organized in symmetrical manner so that total failure of any one circuit will not cause the remaining braking capacity to be asymmetrical, since that would make the pilot's work much more difficult. For example, one landing gear group could be a wing group and another could be a fuselage group, each group having its own feed circuit. It will be understood that under such circumstances the architecture would not be implemented in aircraft having only two wing landing gear units each organized as a separate group, since under such circumstances the failure of one circuit would make braking highly asymmetrical which would be difficult to control.

In an emergency, the pressure available for the brakes comes from the associated accumulator whose capacity must be sufficient to enable the brakes connected to the corresponding circuit to be operated. Under normal circumstances, pressure is maintained in the accumulator by the pressure generator system of the hydraulic circuit. In an emergency, this pressure is maintained by the electrically-driven pump. In addition, the accumulator can be used for the parking brake, i.e. for preventing the aircraft from moving when it is stationary and its engines are not running. Furthermore, since the electrically-driven pump is driven by a motor that is electric, it is not sensitive, a priori, to hydraulic breakdowns.

The failure of any one accumulator involves only two pairs of wheels, each pair being situated on a different landing gear unit, which means that the aircraft retains significant braking capacity, since only four brakes are lost out of a total of about twenty. It is thus possible to clear an aircraft for takeoff even if it has a faulty accumulator.

For safety reasons, each accumulator is advantageously fitted with an overpressure relief valve.

Thus, in the event of pressure in an accumulator becoming excessive, the valve opens and allows a certain quantity of hydraulic fluid to escape into the aircraft's fluid supply, thereby allowing the pressure to drop down to a safety threshold of the accumulator.

Also for safety reasons, the accumulator is fitted with a check valve on the line connecting it to the circuit so as to prevent it from discharging into the circuit in the event of the pressure in the circuit falling.

Still for safety reasons, provision is made for the electrically-driven pump to be associated with its own supply of hydraulic fluid.

Thus, if the aircraft's fluid supply is not available, it is still possible to make use of the pump's fluid supply for braking purposes.

Finally, in an emergency, in order to avoid emptying the pump's fluid supply into the aircraft's supply, the hydraulic circuit advantageously includes a general check valve upstream from the pump, together with a return selector uniting all of the return lines from all of the hydraulic equipment situated downstream from the check valve and directing the return flow of hydraulic fluid either to the aircraft's supply or else to the pump's supply.

Thus, by controlling the return selector so as to direct the return hydraulic fluid flow to the pump's supply, a closed circuit is established which does not run any risk of losing fluid into the aircraft's supply.

Each piece of equipment is advantageously fitted with a check valve on its own return line so that in the event of one of the return lines being broken, the pump's fluid supply is not emptied out via the broken pipework.

This kind of aircraft is expected to fly for very long periods of time, of the order of 15 to 20 hours. Over such a length of time, internal leaks in various pieces of equipment can become non-negligible and can compromise the capacity of the electrically-driven pump to maintain the required pressure level in the portion of the circuit that is isolated by the upstream check valve. In particular, certain pieces of equipment such as proportional control valves (described below) are known to give rise to non-negligible return flow rates. The above disposition ensures that the supply of fluid does not empty out via a broken return line of a piece of hydraulic equipment, given that in practice the return lines are all connected together.

Advantageously, provision is made to arrange at least one braking selector downstream from at least one accumulator so as to allow the hydraulic fluid under pressure to reach the brakes associated with said accumulator, or else prevent it from reaching those brakes.

This selector serves to ensure that the brakes are not operated in untimely manner while the aircraft is in flight, and also to isolate a circuit in the event of pipework breaking downstream from the selector, so as to ensure that the hydraulic fluid supply of the aircraft is not emptied.

In order to apply braking, at least one proportional control valve is provided downstream from at least one braking selector.

The function of the proportional control valve is to modulate the pressure that is actually applied to the pistons of the ring of the associated brake(s), with this modulation being controlled by a braking controller that optimizes pressure as a function of information given by the pilot or by the onboard computer of the aircraft, and as a function of feedback information such as wheel rotation speed, its angular acceleration, or indeed the pressure actually available at the brakes, in application of a predetermined algorithm. The braking controller generates signals for controlling the proportional control valves which then respond as a function of said signals to apply the required pressure to the associated brakes.

In order to provide the parking brake function, it is advantageous for at least one parking selector to be provided downstream from at least one accumulator.

Thus, the pressure of the accumulators is transmitted directly to the corresponding brakes, without said pressure being transmitted via the line that includes the braking selector and/or the proportional control valve(s).

Advantageously, a shuttle valve is placed on the brake feed line connecting it either to the associated proportional control valve or else to the parking selector from which it depends.

In order to monitor the system as a whole, pressure sensors are advantageously provided on the circuit to measure the pressure that exists in the circuit at the outlet from each accumulator.

By means of these sensors, it is possible at all times to monitor the state of the circuit and to trigger alarms, whenever necessary.

To summarize the invention, on tracing the hydraulic circuit line of the aircraft conveying hydraulic fluid under pressure from the pressure generator system, there will be found in succession: the general check valve, and then the connection from the electrically-driven pump to the circuit. The line then splits into as many lines as there are accumulators, or, which amounts to the same, as many lines as there are twice two pairs of brakes. Tracing any one of these lines, there can be found a check valve preventing the accumulator from discharging into the general circuit in the event of pressure in that circuit falling, and then there is the accumulator. At the outlet from each accumulator, and downstream from the above-mentioned check valve, there can be found a line that is opened or closed by the braking selector. At the outlet from this selector, the line is duplicated to feed the two pairs of brakes connected thereto, each pair being mounted on a different landing gear unit. The line is then further duplicated to feed the two proportional control valves for the two brakes in the pair concerned, and finally the line terminates at the brake associated with the control valve via the shuttle valve.

Fluid can also be transmitted directly to a brake without passing via the line that includes the braking selector and the associated proportional control valve. The line coming from the accumulator associated with the brake in question is duplicated so as to be also connected to the parking selector which is in turn directly connected to the brake via the above-mentioned shuttle valve.

Finally, the return lines from each proportional control valve, brake selector, or parking selector are taken to a return selector via check valves, said return selector directing the return flow of hydraulic fluid either to the aircraft's fluid supply, or else to the electrically-driven pump's fluid supply.

BRIEF DESCRIPTION OF THE DRAWING

Other characteristics and advantages of the invention will appear more clearly in the light of the following description of a particular and non-limiting embodiment of the invention described with reference to the sole accompanying FIGURE which is a hydraulic circuit diagram for an architecture of the invention.

MORE DETAILED DESCRIPTION

A braking architecture of the invention comprises one hydraulic circuit per group of landing gear units fitted with brakes, and thus in principle it is applicable to main landing gear units, even though it is not impossible for some or all of the auxiliary landing gear units optionally to be fitted with brakes and therefore to be incorporated in one of the landing gear groups or to constitute an independent group.

For reasons of safety, the landing gear groups under consideration are assumed to be disposed symmetrically about the plane of symmetry of the aircraft, so that in the event of one of the circuits malfunctioning, there need be no question of managing residual braking capacity that is asymmetrical, which would be very difficult in terms of controlling the aircraft properly. Thus, for the intended jumbo-sized aircraft, the fuselage landing gear group and the wing landing gear group are, in practice, arranged symmetrically about the plane of symmetry of the aircraft.

In the invention, all of the landing gear brakes in a group referenced G are associated with a hydraulic circuit referenced C; the FIGURE shows a hydraulic circuit C associated with fuselage landing gear units I and II, each unit possessing six braked wheels. The two landing gear units in group G are represented by respective rectangles. Each rectangle contains three pairs of wheels, each wheel being provided with a hydraulic brake.

The circuits associated with other landing gear groups are similar, such that a description of a single hydraulic circuit suffices to enable the invention to be understood properly. The feed lines to the hydraulic equipment are drawn as continuous lines, while the return lines of the same equipment are drawn as dashed lines.

The hydraulic circuit C shown comprises a general inlet 1 for fluid under pressure coming from a pressure generator system of the aircraft, said system being associated with a hydraulic fluid supply of the aircraft. The system is symbolized by a chain-dotted rectangle referenced 50. It generally comprises hydraulic pumps actuated by the engines of the aircraft, or indeed by the aircraft's auxiliary power unit. A general check valve 2 prevents fluid returning to the aircraft's pressure generator system(s) 50. The circuit C includes a general return line to the supply of the aircraft, represented as being connected to the chain-dotted rectangle. If the aircraft has other landing gear groups each associated with a corresponding hydraulic circuit, those circuits are then likewise connected to the pressure generator system 50.

Thereafter, the circuit C splits into three similar branches 3, 103, and 203. Each branch is designed to feed two pairs of wheels, respectively I.1 & II.1, I.2 & II.2, and I.3 & II.3, each of the pairs concerned being mounted on a distinct landing gear unit. The branch 3 is described in greater detail below; it will be understood that the other two branches 103 and 203 are exactly identical, and that the references and the explanations relating to the referenced elements can be transposed directly to those other two branches merely by adding 100 or 200 to the corresponding references for the elements concerned in the first branch. For the sake of clarity, even if they are used in the description or the claims, not all of the references plus 100 or plus 200 are marked on the FIGURE, however their meaning and the elements to which they refer can be derived in obvious manner from the references applicable to the branch which is described.

The branch 3 has firstly a check valve 4 for preventing the fluid contained in an accumulator 5 situated downstream from the check valve 4 from flowing back into the aircraft's circuit, or into the other branches. The function of the accumulator 5 is described in greater detail below. The accumulator 5 is fitted with an overpressure relief valve 13 for limiting the pressure of the fluid contained in said accumulator. It should be observed that the accumulator 5 is kept under pressure (or reinflated where appropriate) by the aircraft's generator system 50 so long as it is in operation.

The branch 3 then splits to feed firstly a braking selector 6 and secondly a parking selector 7. In this case, these selectors are implemented as solenoid valves, i.e. as electrically-controlled valves, allowing fluid to pass to the portion of circuits situated downstream therefrom or else putting said downstream portion into communication with the aircraft's fluid supply.

The braking selector 6 is connected to four proportional control valves 8a, 8b, 8c, and 8d, with the valves 8a and 8b being associated with brakes 9a and 9b in landing gear unit I, while the valves 8c and 8d are associated with brakes 9c and 9d of landing gear unit II. Each control valve 8a, 8b, 8c, 8d feeds the associated brake 9a, 9b, 9c, 9d via a shuttle valve having a respective reference 10a, 10b, 10c, 10d. The shuttle valves 10a, 10b, 10c, 10d have four other, opposite inlets connected to the outlet from the parking selector 7.

Thus, by using the shuttle valves 10a, 10b, 10c, 10d, the brakes 9a, 9b, 9c, 9d can be fed either from the braking selector 6 and the associated proportional control valve 8a, 8b, 8c, 8d, or else from the parking selector 7. The first case corresponds to use in braking the aircraft, during which the proportional control valves 8a, 8b, 8c, 8d modulate the pressure that is supplied to them for the purpose of controlling the braking torque generated by the associated brakes 9a, 9b, 9c, 9d; the second case corresponds to preventing the aircraft from moving when its engines are stopped. Under such circumstances, the aircraft's pressure generator system 50 is not in operation, so parking pressure is supplied by the accumulator 5. The check valve 4 then prevents the accumulator 5 from emptying into the line 3, and thus into the aircraft's fluid supply, given that when it is stopped, the pressure generator pressure 50 can provide a return path to the aircraft's fluid supply.

The first function performed by the accumulators 5, 105, 205 is thus to allow the parking brake to operate, i.e. to ensure that the aircraft does not move when not in operation.

A fuse 11a, 11b, 11c, 11d is associated with each brake 9a, 9b, 9c, 9d, the fuse being intended to prevent the circuit emptying completely in the event of pipework downstream from the fuse braking. The pipework in question is the pipework that runs along the landing gear and which is thus potentially exposed to various kinds of shock, such as impacts from gravel, or pieces of tire after a puncture, that could damage it sufficiently to give rise to a leak.

The circuit for feeding each brake 9a, 9b, 9c, 9d is fitted with a respective pressure sensor 12a, 12b, 12c, 12d tapped on the corresponding line going from a fuse 11a, 11b, 11c, 11d to the corresponding brake 9a, 9b, 9c, 9d so as to measure the pressure that is actually applied to the brakes. This information is used by a braking controller (not shown) in order to generate commands for the proportional control valves 8a, 8b, 8c, 8d which serve to modulate the pressure applied to the associated brakes. This modulation serves to optimize braking by preventing the wheels from locking and by ensuring that the running speed of the wheel relative to the ground gives rise to a high degree of friction.

In the event of the pressure generator system 50 breaking down, the accumulators 5, 105, 205 are dimensioned so as to be capable of delivering pressure and flow rate to enable the two pairs of brakes associated therewith to be used during a landing. This constitutes the second function of the accumulators 5, 105, 205. It is therefore essential for an accumulator to maintain pressure close to nominal pressure, at least throughout one flight, which for this kind of aircraft can last for more than 15 hours.

Unfortunately, the hydraulic circuit C can leak hydraulic fluid to the outside. Even though such leaks are small, the total leakage over a flight of long duration can lead to pressure dropping so as to become incompatible with proper operation of the brakes, assuming that the accumulators 5, 105, 205 are not reinflated by the aircraft's pressure generator system 50 due to a failure at the beginning of a flight. In order to maintain circuit pressure at a level that is sufficiently high, or indeed in order to accommodate sudden failure of one of the accumulators, an electrically-driven pump 30 is connected to the circuit, downstream from the general check valve 2 in order to deliver fluid under pressure into the circuit. This electrically-driven pump (which is single in this case and common to all of the accumulators 5, 105, 205) is provided with an electric motor 31 suitable for ensuring that the pressure in the circuit continues to be assured even in the event of the aircraft engines failing, the motor 31 then being powered electrically from the aircraft's auxiliary power unit which is independent of its engines.

The pump is provided with a protective check valve 32 and delivers into the circuit downstream from the general check valve 2, so as to prevent the fluid it pumps from returning towards the aircraft's pressure generator system. The electrically-driven pump 30 pumps fluid from a fluid supply 33 specific thereto which is isolated from the aircraft's fluid supply. The supply 33 is fed by the return lines from all of the hydraulic equipment downstream from the pump, i.e. the relief valves 13, 113, 213 of the accumulators 5, 105, 205, the braking selectors 6, 106, 206, the parking selectors 7, 107, 207, and the proportional control valves 8a . . . 8d, 108a . . . 108d, 208a . . . 208d, all of these return lines being united via a common line 34 and diverted towards the pump's fluid supply 30 by a return selector 35.

Under normal circumstances, this selector 35 puts the return lines from the hydraulic equipment into communication with the aircraft's fluid supply via a check valve 36 and a line 39 represented as being connected to the pressure generator system 50 which includes, as mentioned above, the aircraft's hydraulic fluid supply.

However, when the electrically-drive pump 30 is in operation, it delivers into the circuit C, and the return from the equipment fed in this way is diverted by the return selector 35 to the supply 33 of the pump 30. This provides a closed circuit preventing the content of the pump's fluid supply 33 from flowing into the aircraft's fluid supply.

In order to ensure that the fluid supply 33 for the electrically-driven pump does not empty via broken return pipework from the hydraulic equipment, each piece of equipment is fitted on its return line with a check valve given overall reference 40, serving to prevent return from any piece of equipment flowing into broken return pipework of some other piece. In particular, it is known that proportional control valves 8a, 8b, 8c, 8d give rise to non-negligible return flows when in operation. Such a return flow could compromise the level of fluid in the fluid supply 33 for the electrically-driven pump 30 were it to be dumped to the outside through broken return pipework.

The electrically-driven pump is provided with a relief valve 37 on its upstream side to protect it against overpressure at its admission. This relief valve 37 also protects the fluid supply 33 against overpressure, by delivering overflow into the aircraft's supply.

Because of the presence of the electrically-driven pump 30, it is possible to reduce the size of the accumulators 5, 105, 205, given that the electrically-driven pump is capable of maintaining an acceptable pressure level in the event of an accumulator failing. The accumulators 5, 105, 205 are merely required to be capable of maintaining acceptable pressure during substantially half of a flight of standard duration. This makes it possible to fit accumulators that are lighter in weight and less bulky.

A pressure sensor 14 is associated with each accumulator in order to monitor its pressure and cause the electrically-driven pump 30 to be switched on in the event of pressure falling excessively in an accumulator.

The invention is not limited to the particular embodiment described above, but on the contrary seeks to cover any variant which uses equivalent means to reproduce the essential characteristics as defined in the claims.

In particular, even though the invention stems from a need to deal with constraints specific to installing a large number of main landing gear units on jumbo-sized aircraft, it will naturally be understood that the invention can be applied directly to aircraft of more conventional size having only two main landing gear units. Under such circumstances, there is only one main landing gear group to be taken into consideration, and only one main hydraulic braking circuit, assisted by a sufficient number of accumulators and a common electrically-driven pump.

Although the embodiment described is provided with one braking selector and one parking selector per accumulator, it is possible to vary the number of selectors. In particular, architectures have been envisaged which have only one parking selector for all of the brakes in the group associated with the circuit. Under such circumstances, the accumulator associated with the single parking selector is dimensioned accordingly, while the other accumulators can be of smaller size since they are no longer required to perform the parking function. It is even possible to envisage using an additional accumulator that is intended solely for performing the parking function in association with the single parking selector, in which case said accumulator does not need to be able to provide the emergency braking function.

Finally, the accumulators could be of the gas type (with a separating piston, bladder, bellows, . . . ), of the spring type, or of any equivalent type.

What is claimed is:

1. An architecture for a hydraulic braking system suitable for an aircraft having at least one group of main landing gear units, each landing gear unit comprising a determined number of wheels each provided with a hydraulically actuated brake, the or each landing gear group being associated with a hydraulic circuit provided with hydraulic equipment and adapted to deliver hydraulic fluid under pressure to all of the brakes of the landing gear group, the hydraulic fluid being pressurized by at least one aircraft pressure generator system associated with an aircraft hydraulic fluid supply, wherein accumulators are connected on the or each circuit in sufficient number for each accumulator to feed two pairs of brakes, each pair of brakes being mounted on a distinct landing gear unit, and wherein an electrically-driven pump is arranged to maintain a predetermined pressure level in all of the accumulators of the or each said circuit.

2. An architecture according to claim 1, wherein at least one accumulator is fitted with an overpressure relief valve.

3. An architecture according to claim 1, wherein at least one check valve is installed on the line connecting the accumulator to the aircraft's pressure generator system.

4. An architecture according to claim 1, wherein the electrically-driven pump is associated with its own supply of hydraulic fluid.

5. An architecture according to claim 1, wherein the circuit includes a check valve on the line connecting it to the pressure generator system, upstream from the electrically-driven pump.

6. An architecture according to claim 5, wherein a return selector is arranged to unite the return lines from the hydraulic equipment situated downstream from the general check valve, said return selector directing the return flow of hydraulic fluid either to the aircraft's fluid supply, or else to the fluid supply of the electrically-driven pump.

7. An architecture according to claim 5, wherein at least one piece of hydraulic equipment in the hydraulic circuit is fitted with a check valve on its return line.

8. An architecture according to claim 1, wherein at least one braking selector is arranged on the circuit downstream from at least one accumulator.

9. An architecture according to claim 1, wherein at least one proportional control valve is connected downstream from at least one braking selector.

10. An architecture according to claim 1, wherein at least one parking selector is arranged on the circuit downstream from at least one accumulator.

11. An architecture according to claim 9, wherein at least one parking selector is arranged on the circuit downstream from at least one accumulator, and wherein a shuttle valve is installed upstream from each brake, said shuttle valve being connected firstly to the proportional control valve associated with the brake, and secondly to a parking selector associated with the accumulator feeding the associated brake.

12. An architecture according to claim 1, wherein at least one pressure sensor is associated with at least one accumulator.

\* \* \* \* \*